United States Patent
Takeuchi et al.

(10) Patent No.: US 9,124,079 B2
(45) Date of Patent: Sep. 1, 2015

(54) ELECTRIC JUNCTION BOX

(75) Inventors: Kunihiko Takeuchi, Kakegawa (JP); Hiroaki Yamada, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 35 days.

(21) Appl. No.: 13/214,274

(22) Filed: Aug. 22, 2011

(65) Prior Publication Data

US 2012/0043104 A1    Feb. 23, 2012

(30) Foreign Application Priority Data

Aug. 23, 2010    (JP) .................................. 2010-185748

(51) Int. Cl.
*H01H 9/02* (2006.01)
*H02B 1/052* (2006.01)
*B60R 16/023* (2006.01)

(52) U.S. Cl.
CPC ............ *H02B 1/052* (2013.01); *B60R 16/0238* (2013.01)

(58) Field of Classification Search
CPC ............. H01R 13/6658; H01R 23/025; H01R 13/658; H01R 23/7068; H01R 2201/26; H05K 7/026; B60R 16/0238
USPC ........... 174/50, 520, 535, 541, 559, 569, 561, 174/58, 60, 88 R, 70 C, 50.52, 549, 5, 11; 248/906; 439/76.1, 76.2; 220/3.2, 3.8, 220/4.02; 361/600, 622, 641
See application file for complete search history.

(56) References Cited

U.S. PATENT DOCUMENTS

| | | | | |
|---|---|---|---|---|
| 6,010,341 | A * | 1/2000 | Matsuoka | 439/76.2 |
| 6,108,202 | A * | 8/2000 | Sumida | 361/690 |
| 6,838,616 | B2 * | 1/2005 | Harrison et al. | 174/50 |
| 7,122,738 | B2 * | 10/2006 | Kanamaru | 174/50 |
| 7,837,480 | B2 * | 11/2010 | Akahori | 439/76.2 |
| 2006/0131045 | A1 * | 6/2006 | Okada | 174/50 |
| 2006/0258186 | A1 * | 11/2006 | Egawa et al. | 439/76.2 |
| 2008/0293269 | A1 * | 11/2008 | Kurizono et al. | 439/76.2 |
| 2009/0057119 | A1 * | 3/2009 | Burkett | 200/332.1 |

FOREIGN PATENT DOCUMENTS

| | | |
|---|---|---|
| CN | 1776980 A | 5/2006 |
| CN | 101577405 A | 11/2009 |
| JP | 11-178155 | 7/1999 |

(Continued)

OTHER PUBLICATIONS

Office Action dated Sep. 30, 2013 issued in connection with Chinese Application No. 201110241995.7.

(Continued)

*Primary Examiner* — Jenny L Wagner
*Assistant Examiner* — Pete Lee
(74) *Attorney, Agent, or Firm* — Locke Lord LLP

(57) ABSTRACT

The present invention is to provide an electric junction box which can minimize a case by reducing the capacity of a cover without damage of electric wires. A wiring harness L2 guided from a power integration 3 arranged at a position nearest a guide portion is guided to a guide portion through a gap between a partition wall 42A and a lower cover 5. Further, a wiring harness L1 guided from another cassette block 2 is guided to the guide portion through gaps between the partition walls 42A-42C and peripheral walls 41A, 41E, 41F.

5 Claims, 5 Drawing Sheets

(56) References Cited

FOREIGN PATENT DOCUMENTS

| | | |
|---|---|---|
| JP | 2006-280038 A | 10/2006 |
| JP | 2010-051094 A | 3/2010 |
| JP | 2010-098928 A | 4/2010 |

OTHER PUBLICATIONS

Office Action dated May 13, 2014 issued in connection with Chinese Application No. 201110241995.7.

Office Action dated May 21, 2014 in connection with Japanese Application No. 2010-185748, with English translation.

* cited by examiner

ELECTRIC JUNCTION BOX

The priority application Number Japan Patent Application No. 2010-185748 upon which this patent application is based is hereby incorporated by reference.

BACKGROUND OF THE INVENTION

1. Filed of the Invention

The present invention relates to an electric junction box installed in an engine room of a vehicle and receiving electric component such as a fuse, a relay and so on.

2. Description of the Related Art

Various electric devices are mounted on a vehicle. In the vehicle, an electric junction box is arranged in a suitable place between an electric wire and the electronic device so as to supply electric power with the various electronic devices. Various electric junction boxes are used depending on the type of vehicle. For example, as shown in FIGS. 4 and 5, in a conventional electric junction box 10, block holding various electric parts in a case 1 is received. The case 1 includes a case body 4 made of synthetic resin, an upper cover (not shown) attached to an upper side of the case body 4, and a lower cover 5 attached to a lower side of the case body 4. The electric junction box 10 is attached to an engine room of the vehicle.

In the case body 4, a partition wall 42 separating the case body 4 into a plurality of sections is arranged. In the sections separated by the partition wall 42, a cassette block 2 and a power integration 3 are respectively received. The cassette block 2 is a block for holding the electric parts such as a fuse and a relay. Further, the power integration 3 is a block for holding a substrate mounting the fuse and the relay.

In the cassette block 2 and the power integration 3, wiring harnesses L1, L2 are respectively guided toward the lower cover 5. Each of the wiring harnesses L1, L2 is constructed by bundling a plurality of electric wires. Further, in the case body 4 and the lower cover 5, a guide portion 9 as a guide hole for guiding the wiring harnesses L1, L2 to an outside of the case body 4 is arranged. In the conventional electric junction box 10, as shown in FIG. 5, the wiring harnesses L1, L2 which are guided from the cassette block 2 and the power integration 3 are respectively passed between the partition wall 42, and guided to the guide portion 9 (Patent Documents 1 and 2).

Therefore, when the number of the electric wires is large, the bundle of the electric wires can not be received in a gap between the partition wall 42 of the case body 4 near the guide portion 9 where the electric wires are concentrated and the lower cover 5. As a result, there is a problem such that the lower cover 5 can not be closed. Also, if the lower cover 5 is forcibly closed, the wiring harnesses L1, L2 are forcibly pressed into the gap between the partition wall 42 of the case body 4 and the lower cover 5. Thereby, external force is applied to the electric wires of the wiring harnesses L1, L2 by the partition wall 42 of the case body 4 and the lower cover 5, and the electric wires are received with a condition bent forcibly. As a result, the electric wires are damaged. Specifically, when an aluminum electric wire having weak strength is used as the electric wire, damage of the electric wire is easily generated.

Further, as the power integration 3 shown in FIGS. 4 and 5, when the electric wire is guided near the guide portion 9, the wiring harness L2 guided from the power integration 3 interferes with the wiring harness L1 guided from the cassette block 2 arranged at a position away from the guide portion 9. Thereby, the lower cover 5 can not be more closed. In this case, when the lower cover 5 is forcibly closed, as discussed previously, the electric wires of the wiring harnesses L1, L2 may be damaged. Furthermore, since load is applied to a terminal caulking portion of connector connecting the power integration 3 and the wiring harness L2 guided from the power integration 3, poorly fitting electrical contacts may be produced.

So, in order to resolve the above problem, so far, the gap between the lower cover 5 and the partition wall 42 was increased so as to avoid damaging the electric wires. However, when the gap between the lower cover 5 and the partition wall 42 is increased, the capacity of the lower cover 5 is increased. As a result, there is a problem such that the whole of the case 1 becomes larger.

[Patent document 1] JP, A, 2010-51094
[Patent Document 2] JP, A, 2006-280038

SUMMARY OF THE INVENTION

Objects to be Solved

Accordingly, an object of the present invention is an electric junction box having a case downsized by reducing the capacity of a cover without damage of an electric wire.

In order to achieve the above-mentioned objects, an electric junction box of the present invention includes a case having a case body formed in a box shape with a plurality of peripheral walls and a cover for covering a opening formed by edge portions of the peripheral walls; a partition wall separating the case body into a plurality of sections; a block, which an electric wire is led out, the block being received in each section separated by the partition wall; and a guide hole for guiding the electric wire to an outside of the case body, the guide hole be arranged in the case, wherein the electric wire guided from the block is passed through one of a gap between the partition wall and the peripheral wall and a gap between the partition walls, and held to one of the gap between the partition wall and the peripheral wall and the gap between the partition walls, and the electric wire is guided to the guide hole.

Furthermore, the held electric wire is consisted of an aluminum electric wire.

Furthermore, height of the partition wall holding the electric wire is higher than height of the partition wall surrounding the other block.

Effect of the Invention

According to the first aspect of the present invention, since the electric wire guided from the block is passed through one of a gap between the partition wall and the peripheral wall and a gap between the partition walls, and held to one of the gap between the partition wall and the peripheral wall and the gap between the partition walls, and the electric wire is guided to the guide hole, the electric wire can be prevented from be pressed into the gap between the cover and the partition wall. Therefore, the electric wire can be protected from applying external force or being forcibly bent, and can be prevented from damaging. Thereby, the size of the case can be minimized by reducing the capacity of the cover without damage of the electric wire.

Furthermore, according to the second aspect of the present invention, the aluminum electric wire having weak strength can be securely protected.

Furthermore, according to the third aspect of the present invention, height of the partition wall holding the electric wire is higher than height of the partition wall surrounding the other block. Thereby, the gap between the peripheral wall and the partition wall, in which the electric wire is passed, or the gap between the partitions, in which the electric wire is passed, can be increased. Furthermore, the electric wire held with the partition walls is passed through the gap between the partition wall and the peripheral wall or the gap between the partition walls over the partition wall surrounding the other block having low height. Thereby, the electric wire is not bent idly.

The above and other objects and features of this invention will become more apparent from the following description taken in conjunction with the accompanying drawings.

DESCRIPTION OF THE PREFERRED EMBODIMENT

Figure 1:
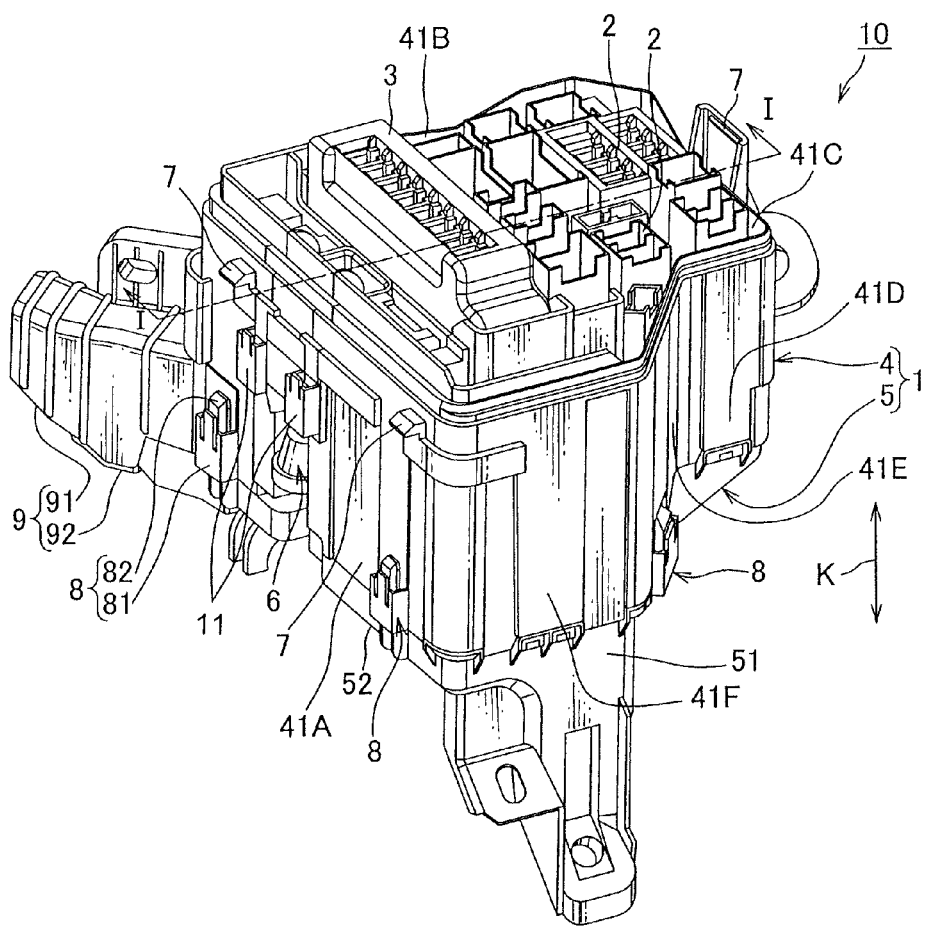
FIG. 1 is a perspective view showing an electric junction box of an embodiment in the present invention.
Figure 2:
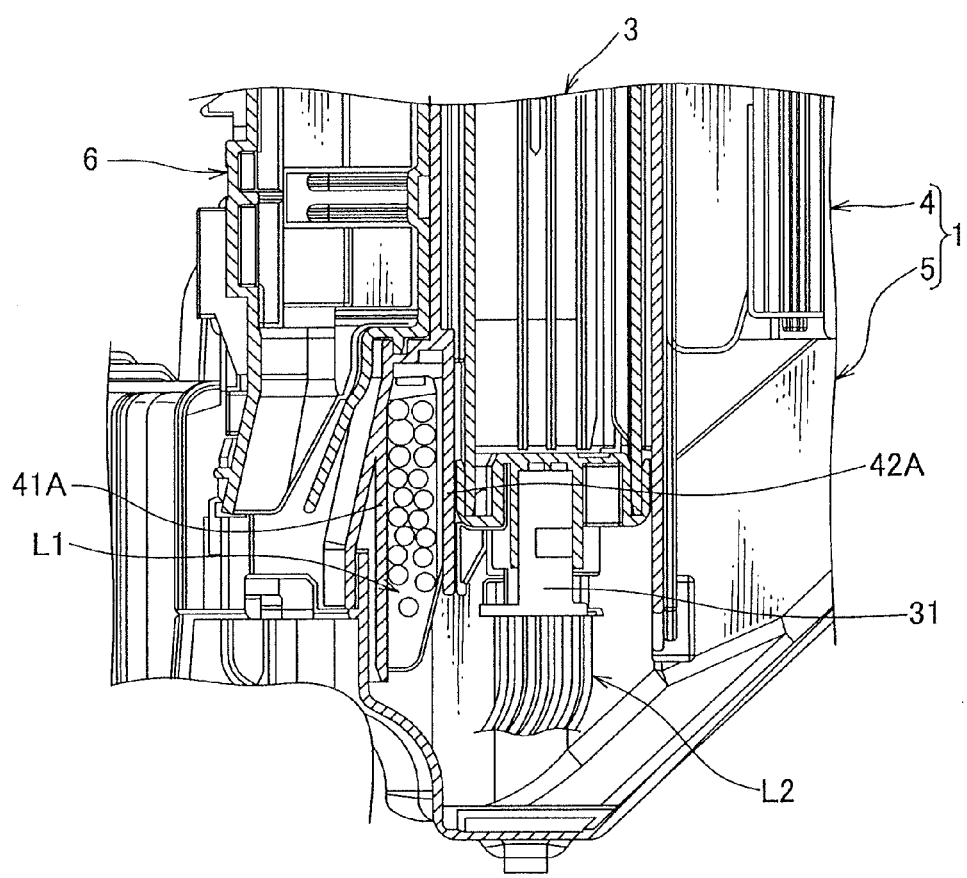
FIG. 2 is a cross-sectional view taken along the line I-I in FIG. 1.
Figure 3:
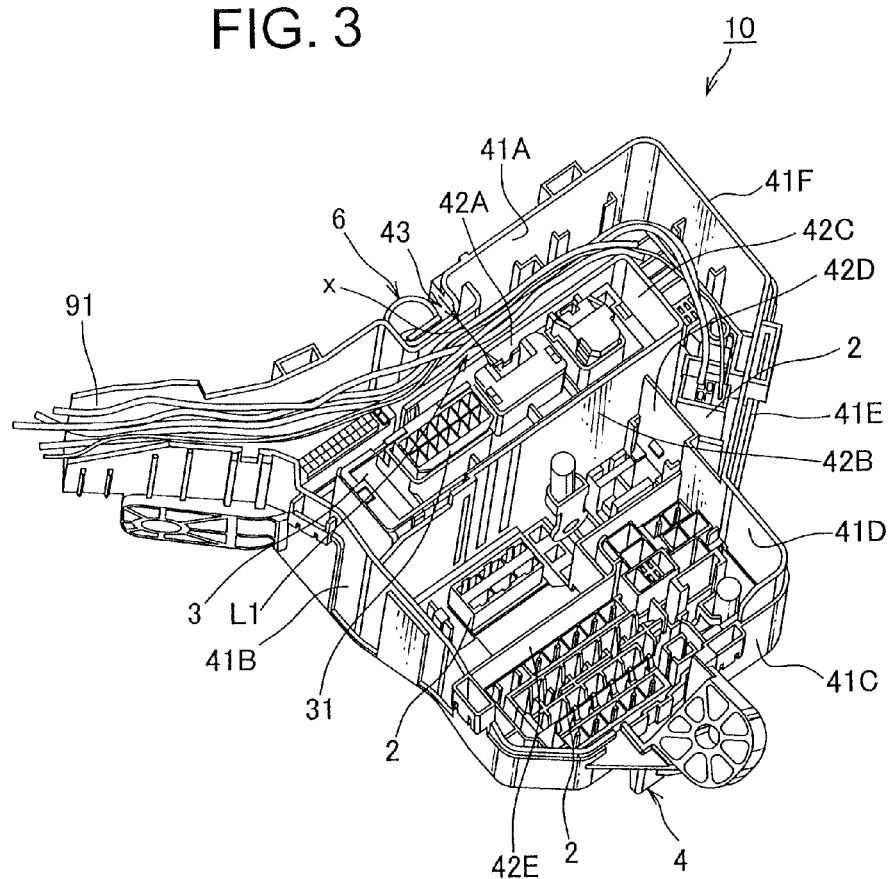
FIG. 3 is a view seeing a case body constructing the electric junction box shown in FIG. 1 from a lower case.
Figure 4:
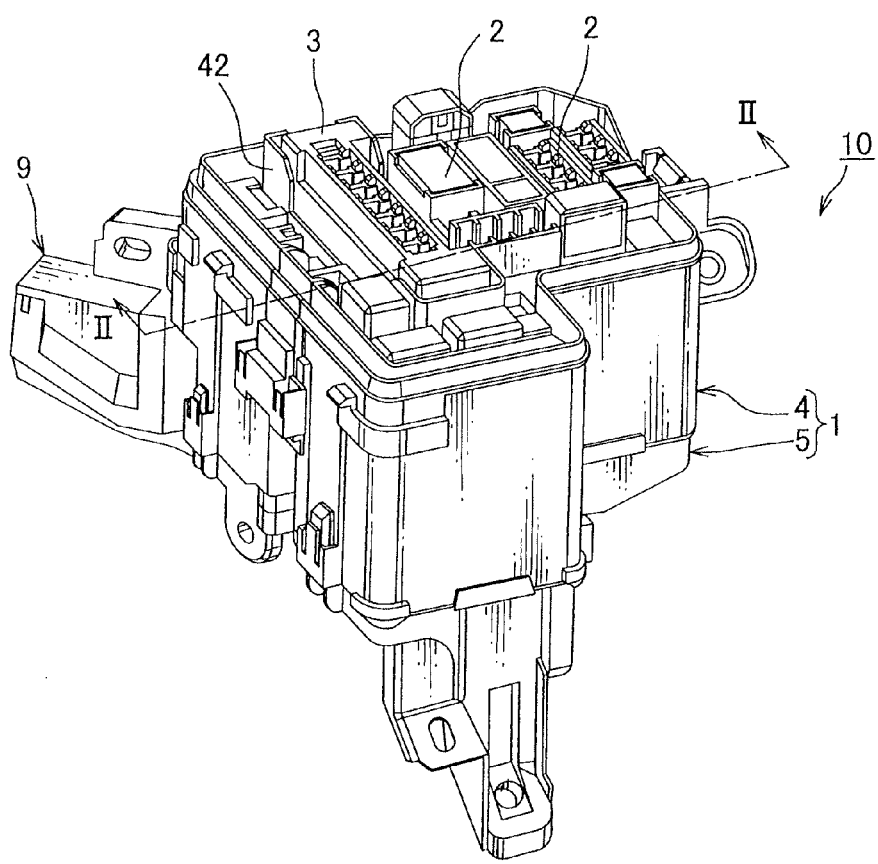
FIG. 4 is a perspective view showing one example of a conventional electric junction box.
Figure 5:
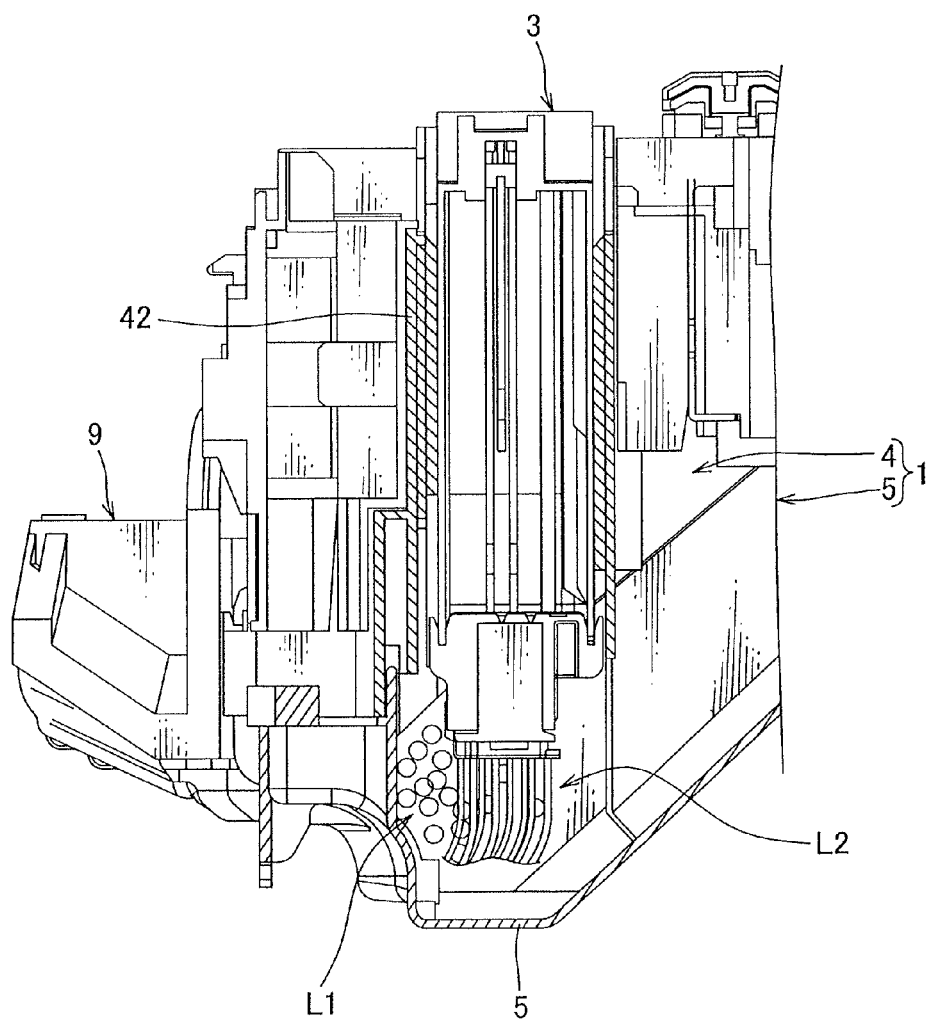
FIG. 5 is a cross-sectional view taken along the line II-II in FIG. 4.

Hereinafter, an electric junction box 10 according to an embodiment of the present invention will be explained with reference to FIGS. 1 to 3. FIG. 1 is a perspective view showing an electric junction box of the embodiment in the present invention. Further, FIG. 1 shows a state which removed an upper cover from a case body constituting a case. FIG. 2 is a cross-sectional view taken along the line I-I in FIG. 1. FIG. 3 is a view seeing a case body constructing the electric junction box shown in FIG. 1 from a lower case. Further, in FIG. 3, W/H L2 guided from the power integration 3 is omitted.

The electric junction box 10 according to the embodiment is attached to an engine room of a vehicle, and receives electronic parts such as a relay, a fuse, a bus bar and so on. Further, the electronic parts and various electric equipments mounted on the vehicle are electrically connected to the electric junction box 10 based on a predetermined pattern.

This electric junction box 10 includes a case 1 forming the electric junction box, a cassette block 2 and a power integration 3. The cassette block 2 and the power integration 3 are received in the case 1. First, construction of the above cassette block 2 and the power integration 3 will be explained before explaining the case 1. The above cassette block 2 is made of insulation synthetic resin, and formed by well-known mold injection. In the cassette block 2, electric parts such as a fuse (not shown), a fusible link, a relay, a bus bar and the like are installed.

The above power integration 3 includes a box-shaped case made of insulation synthetic resin. In the case 1, electrical parts such as a fuse, a relay and the like are mounted, and a substrate (not shown) in which wiring patterns of the fuse and the relay are formed is embedded. Further, in order to connect with external electronic devices, the wiring harnesses L1, L2 having the plurality of electric wires are respectively guided from the cassette block 2 and the power integration 3 (see FIG. 2). Incidentally, the wiring harness L1 is guided from the cassette block 2, and the wiring harness L2 is guided from the power integration 3. Further, in the wiring harness L1, an aluminum electric wire having weak strength is included.

As shown in FIG. 3, the wiring harness L1 is guided from the lower cover 5 arranged in the case 1 described below of the cassette block 2. Namely, the wiring harness L1 is guided from the lower side of the vertical direction K. And then, the wiring harness L1 is received in the case 1. Further, as shown in FIG. 2, the power integration 3 includes a connector 31 arranged in the side of the lower cover 5. The wiring harness L2 connected to the connector 31 is guided to the lower cover 5 (namely, the lower side of the vertical direction K), and is received in the case 1. Furthermore, as is evident in FIG. 3, height of the power integration 3 is higher than height of the cassette block 2 in the vertical direction K. furthermore, the wiring harness L2 guided from the power integration 3 is guided to the lower cover 5 lower than the wiring harness L1 guided from the other cassette block 2.

Next, construction of the case 1 will be explained. As shown in FIG. 1, the case 1 has a case body 4 receiving the cassette block 2 and the power integration 3, an upper cover (not shown) removably arranged on the upper side of the case body 4, the lower cover 5 removably arranged on the upper side of the case body 4 as a cover, and a side cover 6 removably arranged on the side surface of the case body 4. The case body 4, the upper cover, the lower cover 5 and the side cover 6 are made of insulation synthetic resin, and formed by well-known mold injection.

As shown in FIGS. 1-3, the case body 4 is formed with a tubular shape having an opening formed in both side of the vertical direction K with a plurality of peripheral walls 41A-41E extending along the vertical direction K and continuing each other.

As shown in FIGS. 1-3, the case body 4 is formed with a tubular shape having an opening formed in both side of the vertical direction K by a plurality of peripheral walls 41A-41E extending along the vertical direction K and continuing each other. Further, as shown in FIG. 3, in the case body 4, partition walls 42A-42E are arranged. The case body 4 is separated into a plurality of sections by the partition walls 42A-42E. In the sections separated by the partition walls 42A-42E in the case body 4, the cassette block 2 and the power integration 3 are respectively received.

The upper cover (not shown) includes a ceiling wall covering the opening formed with the upper edges of the peripheral walls 41A-41F in the case body 4 and a peripheral wall extending from the outer edge of the ceiling wall toward the lower side of the vertical direction K, and is formed in a box shape opening toward the lower side of the vertical direction K. Further, the upper cover is attached to the upper side of the case body 4 so that the opening formed in the upper edge of the peripheral walls 41A-41F in the case body 4 is covered.

Furthermore, in the peripheral walls 41A-41F of the case body 4 and the peripheral wall (not shown) of the upper cover, a plurality of locking portions (not shown) for fixing the case body 4 and the upper cover each other are arranged. The locking portion includes a projection 7 projecting from the peripheral walls 41A-41F of the case body 4 toward the outside thereof and a lock arm (not shown) projecting from the peripheral wall of the upper cover toward the lower side of the vertical direction K. Further, the lock arm can lock with the projection 7 arranged in the peripheral walls 41A-41F of the case body 4.

The lower cover 5 includes a bottom wall 51 covering the opening formed with the lower edge of the peripheral walls 41A-41F in the case body 4 and a peripheral wall 52 extending from the outer edge of the bottom wall 51 toward the upper side of the vertical direction K. Further, the lower cover 5 is formed in a box shape opening toward the upper side of the vertical direction K. furthermore, the lower cover 5 is attached to the lower side of the case body 4 so that the opening formed in the lower edge of the peripheral walls 41A-41F in the case body 4 is covered.

Further, in the peripheral walls 41A-41F of the case body 4 and the peripheral wall the lower cover 5, as shown in FIG. 1, a plurality of locking portions 8 for fixing the case body 4 and the lower cover 5 each other are arranged. The locking portion 8 includes a lock-receiving portion 81 and a lock aim 82. The lock-receiving portion 81 is formed in a U shape, and projects from the peripheral walls 41A-41F of the case body 4 toward the outside thereof. The lock arm 82 projects from the peripheral wall 52 of the lower cover 5 toward the upper side of the vertical direction K. When the lock arm 82 is inserted into a locking hole formed between the peripheral wall 41 of the case body 4 and the lock-receiving portion 81, the lock arm 82 is locked with the lock-receiving portion 81.

Additionally, in the case body 4 and the lower cover 5, as shown in FIGS. 1-3, a tubular guide portion 9 having a guide hole for guiding the wiring harnesses L1, L2 to an outside of the case body 4 is arranged. The guide portion 9 includes a guide portion body 91 and a plate portion 92. The guide portion body 91 is formed with a gutter shape, and is extended from the corner between the peripheral wall 41A and the peripheral wall 41B next to each other toward the outside of the case 1. The guide portion body 91 is opened in the lower side of the vertical direction K. The plate portion 92 extends from the lower cover 5, and covers the opening of the guide portion body 91. The wiring harness L1 guided from the cassette block 2 and the wiring harness L2 guided from the power integration 3 are arranged in the case 1 toward the guide portion 9.

Next, positional relation of the guide portion body 91 and the partition walls 42A-42E arranged in the case body 4 will be explained with reference to FIG. 3. The partition walls 42A, 42B are arranged parallel to the peripheral wall 41A and apart from each other. The end portions of the peripheral walls 41A, 41B are respectively connected to the end portions of the guide portion body 91.

Between the partition wall 42A and the peripheral wall 41A, a gap is arranged. In the gap, the wiring harness L1 guided from the cassette block 2 is arranged. The partition wall 42C is connected to the end portions of the partition walls 42A, 42B away from the guide portion body 91. The peripheral walls 42A, 42B and 42C are an attachment portion of the power integration 3, and the power integration 3 is received in a gap surrounded with the partition walls 42A, 42B and 42C. Further, between the partition wall 42C and the peripheral wall 41F which is positioned away from the guide portion body 91 and is located next to the peripheral wall 41A, a gap is arranged. In this gap, the cassette block 2 is received.

The partition wall 42D is arranged between the partition wall 42B and a joint connecting the peripheral wall 41D of the case body 4 and the peripheral wall 41E thereof. The partition wall 42E is arranged parallel to the peripheral wall 41A so that a section away from the peripheral wall 41A is divided into two sections. In each of the two sections divided by the partition wall 42D, the cassette block 2 is respectively received. The cassette block 2 received in each section divided by the partition wall 42D is positioned away from the guide portion 9 farther than the power integration 3 in the case body 4.

As is clear from the above, the power integration 3 is positioned nearest to the guide portion 9. Also, the wiring harness L1 guided from the cassette block 2 is passed through a gap between the partition wall 42C and the peripheral wall 41E covering the outside of the partition wall 42C, a gap between the partition wall 42C and the peripheral wall 41F covering the outside of the partition wall 42C, and a gap between the partition wall 42A and the peripheral wall 41A covering the outside of the partition wall 42A. Thereafter, the wiring harness L1 is guided to the guide portion 9.

On the other hand, the power integration 3 is passed between the partition wall 42A and the lower cover 5. In other words, the power integration 3 is passed through the end surface, which is arranged in the lower side of the vertical direction K, of the partition wall 42A. Thereafter, the power integration 3 is guided to the guide portion 9 without passing between the peripheral walls 41A, 41E, 41F and the partition walls 42A-42C. That is, the wiring harness L2 guided from the power integration 3 near the guide portion 9 is arranged in the lower side of the vertical direction K of the wiring harness L1 guided from the cassette block 2. Further, height of the partition walls 42A-42C surrounding the power integration 3 which is positioned nearest to the guide portion 9 is higher than height of the partition walls 42D, 42E surrounding another cassette block 2.

The side cover 6 is slidably and removably arranged in a groove 43 (see FIG. 3) along the vertical direction K. The groove 43 is arranged in the peripheral wall 41A of the case body 4. In the side cover 6 and the case body 4, two locking portions for fixing the side cover 6 and the case body 4 each other are arranged The locking portion includes a lock-receiving portion 11 and a lock arm (not shown). The lock-receiving portion 11 projects from the side cover 6 toward the outside thereof, and is formed in a U-shaped section. The lock arm projects from the peripheral wall 41A of the case body 4 toward the upper side of the vertical direction K. furthermore, when the lock arm inserted into a lock hole formed between the side cover 6 and the lock-receiving portion 11, the lock arm locks with the lock-receiving portion 11. The side cover 6 is formed in a tubular shape, and can pass a wiring harness (not shown) which is connected to a battery guided from the cassette block 2 and the power integration 3 through the inside of the side cover 6.

By arranging the side cover 6 in the case 1, as shown in FIG. 3, a gap between the groove 43 inserting the side cover 6 and the partition wall 42A is the smallest place as compared with gaps between the peripheral walls 41A, 41E, 41F and the partition walls 42A-42C. The size X shown in FIG. 3 of the groove 43 is formed with a size which can hold the wiring harness L1 passing between the groove 43 and the partition wall 42A. That is, the size X is formed with a size which can avoid the wiring harness L1 from falling out the gap between the groove 43 and the partition wall 42A by applying a force to the wiring harness L1 from the groove 43 and the partition wall 42A. Incidentally, "the electric wire is held between the partition wall and the peripheral wall" in claims, as shown in FIG. 3, is holding the electric wire to a part of the gap between the partition wall 42A and the groove 43.

According to this embodiment described above, the wiring harness L1 guided from the cassette block 2 passes between the partition walls 42A-42C and the peripheral walls 41A, 41E, 41F, and is held between the partition wall 42A and the peripheral wall 41A. Thereafter, the wiring harness L1 is guided through the guide portion 9 as a guide hole. Thereby, the wiring harness L1 can be prevented from being pushed into the gap between the lower cover 5 and the partition wall 42A. Therefore, the wiring harness L1 can be protected from applying external force or being forcibly bent. Furthermore, the wiring harnesses L1, L2 arranged in the inside of the case body 4 can be prevented from damaging without increasing the capacity of the lower cover 5. Thereby, the size of the case 1 can be minimized by reducing the capacity of the lower cover 5 without damage of the wiring harnesses L1, L2.

Furthermore, according to this embodiment described above, the held wiring harness L1 includes the aluminum electric wire. Therefore, the aluminum electric wire having weak strength can be certainly protected. Further, according to this embodiment described above, as shown in FIG. 2, the wiring harness L2, which guided from the power integration 3 arranged at a position close to the guide portion 9, is guided to the guide portion 9 through the gap between partition wall 42A and the lower cover 5. Also, the wiring harness L1 guided from another cassette block 2 is guided to the guide portion 9 through the gaps between the partition walls 42A-42C and the peripheral walls 41A, 41E, 41F. Thereby, the wiring harness L2 guided from the power integration 3 arranged at a position nearest the guide portion 9 doesn't interfere in the wiring harness L1 guided from the cassette block 2 arranged at a position away from the guide portion 9. Therefore, all the more, the size of the case 1 can be minimized by reducing the capacity of the lower cover 5 without damage of the wiring harnesses L1, L2.

Also, according to this embodiment described above, the partition walls 42A-42C surrounding the power integration 3 arranged at a position close to the guide portion 9, that is, the partition wall 42A holding the wiring harness L1 is formed with height higher than the partition walls 42D, 42F which surround the other cassette block 2. Thereby, the gaps between the peripheral walls 41A, 41E, 41F and the partition walls 42A-42C, which passes the wiring harness L1, can be increased. Further, for example, the wiring harness L1, which guided from the cassette block 2 received in the section away from the guide portion 9 and arranged near the peripheral wall 41C, is guided between the peripheral walls 41A, 41E, 41F and the partition walls 42A-42C over the end surface of the partition walls 42D, 42E which surrounds the cassette block 2 in the lower side of the vertical direction K. At this time, if the partition walls 42D, 42E are the same heights as the partition walls 42A-42C, the wiring harness L1 must be bent in the upper side of the vertical direction K so as to guide the wiring harness L1 to the gaps between the peripheral walls 41A, 41E, 41F and the partition walls 42A-42C after passing the electric wire L1 through the partition walls 42D, 42E. In contrast, in this embodiment, since the partition walls 42D, 42E are lower than the partition walls 42A-42C, the wiring harness L1 is not bent idly.

In addition, according to this embodiment described above, the wiring harness L1 passes between the partition wall 42A and the peripheral wall 41A, and then is held to the gap between the partition wall 42A and the peripheral wall 41A. However, the present invention is not limited thereto. For example, the wiring harness L1 may is passed through gaps between the partition walls 42A-42E and the partition walls 42A-42E, and then is held to the gaps between the partition walls 42A-42E and the partition walls 42A-42E.

Further, according to this embodiment described above, the wiring harness L2 guided from the power integration 3 doesn't pass between the partition walls 42A-42C and the peripheral walls 41A, 41E, 41F. However, the present invention is not limited thereto. If the power integration 3 is arranged at a portion away from the guide portion 9, the wiring harness L2 may be guided to the guide portion 9 through the gaps between the partition walls 42A-42C and the peripheral walls 41A, 41E, 41F.

Additionally, according to this embodiment described above, the block nearest the guide portion 9 is the power integration 3, however the present invention is not limited thereto. Another cassette block 2 may be arranged at a position nearest the guide portion 9.

The embodiments described herein are only representative embodiments and are not intended to limit the present invention. It will be understood that various modifications to the embodiments may be made without departing the scope of the present invention.

What is claimed is:

1. An electric junction box comprising:
    a case having a case body formed in a box shaped with a plurality of peripheral walls and a cover for covering an opening formed by edge portions of the peripheral walls;
    a plurality of partition walls separating the case body into a plurality of sections within the electric junction box;
    a block through which an electric wire is led out, the block being received in each section separated by the partition wall;
    another block through which another electric wire is led out disposed in a separate section than the block and separated by at least one of the partition walls within the electric junction box;
    a guide hole for guiding the electric wire to an outside of the case body, the guide hole being arranged in the case,
    wherein the electric wire guided from the block is arranged along a first wiring path such that it passes through one of a gap between the partition wall and the peripheral wall and a gap between the partition walls, is held to one of the gap between the partition wall and the peripheral wall and the gap between the partition walls, and is guided to the guide hole,
    wherein the another electric wire guided from the another block is arranged along a second wiring path such that it passes a space disposed between the plurality of partition walls and a bottom of the cover and is guided to the guide hole,
    wherein the electric wire guided from the block does not follow the second wiring path, and the another electric wire guided from the another block does not follow the first wiring path, and
    wherein height of the partition wall holding the electric wire is higher than height of the partition wall surrounding the other block.

2. The electric junction box as claimed in claim 1, wherein the held electric wire is consisted of an aluminum electric wire.

3. The electric junction box as claimed in claim 1, wherein the guide hole communicates with the space defined by the plurality of partition walls in which the other block is received, the peripheral wall through which the electric wire led out through the block is passed, and the bottom of the cover.

4. An electric junction box comprising:
    a case having a case body formed in a box shaped with a plurality of peripheral walls and a cover for covering an opening formed by edge portions of the peripheral walls;
    a plurality of partition walls separating the case body into a plurality of sections within the electric junction box;
    a block through which an electric wire is led out, the block being received in each section separated by the partition wall;
    another block through which another electric wire is led out disposed in a separate section than the block and separated by at least one of the partition walls within the electric junction box;
    a guide hole for guiding the electric wire to an outside of the case body, the guide hole being arranged in the case,
    wherein the electric wire guided from the block is passed through one of a gap between the partition wall and the peripheral wall and a gap between the partition walls, held to one of the gap between the partition wall and the peripheral wall and the gap between the partition walls, and guided to the guide hole such that it is prevented from being pushed into a space disposed between the plurality of partition walls and a bottom of the cover, wherein the another electric wire guided from the another block passes the space disposed between the plurality of partition walls and the bottom of the cover, and is guided to the guide hole, wherein a wiring path of the one electric wire guided from the one block to the guide hole is different from a wiring path of the another electric wire guided from the another block to the guide hole, and wherein height of the partition wall holding the electric wire is higher than height of the partition wall surrounding the other block.

5. An electric junction box comprising:

a case having a case body formed in a box shaped with a plurality of peripheral walls and a cover for covering an opening formed by edge portions of the peripheral walls;

a plurality of partition walls separating the case body into a plurality of sections within the electric junction box;

a block through which an electric wire is led out, the block being received in each section separated by the partition wall;

another block through which another electric wire is led out disposed in a separate section than the block and separated by the plurality of partition walls within the electric junction box to form a wiring path of the another electric wire to the guide hole that is different than a wiring path of the one electric wire guided from the one block to the guide hole;

a guide hole for guiding the electric wire to an outside of the case body, the guide hole being arranged in the case, wherein the electric wire guided from the block is passed through one of a gap between the partition wall and the peripheral wall and a gap between the partition walls, and held to one of the gap between the partition wall and the peripheral wall and the gap between the partition walls, and the electric wire is guided to the guide hole, herein the another electric wire guided from the another block passes a space disposed between the plurality of partition walls and a bottom of the cover, and is guided to the guide hole wherein a wiring path of the one electric wire guided from the one block to the guide hole is different from a wiring path of the another electric wire guided from the another block to the guide hole, and wherein height of the partition wall holding the electric wire is higher than height of the partition wall surrounding the other block.

* * * * *